United States Patent
Cheng (10) Patent No.: US 9,049,957 B2
(45) Date of Patent: Jun. 9, 2015

(54) INFUSION DEVICE FOR INFUSION CAPSULES AND THE LIKE, PARTICULARLY FOR ESPRESSO COFFEE MACHINES AND THE LIKE

(75) Inventor: Rocky Cheng, Hong Kong (CN)

(73) Assignee: Swiss Caffe Asia Ltd., Fo Tan Shatin, N.T., Hong Kong (CN)

( * ) Notice: Subject to any disclaimer, the term of this patent is extended or adjusted under 35 U.S.C. 154(b) by 408 days.

(21) Appl. No.: 13/501,292

(22) PCT Filed: Sep. 27, 2010

(86) PCT No.: PCT/EP2010/064282
§ 371 (c)(1),
(2), (4) Date: Apr. 11, 2012

(87) PCT Pub. No.: WO2011/045175
PCT Pub. Date: Apr. 21, 2011

(65) Prior Publication Data
US 2012/0199011 A1  Aug. 9, 2012

(30) Foreign Application Priority Data

Oct. 15, 2009 (IT) .............................. MI2009A1770

(51) Int. Cl.
A47J 31/40 (2006.01)
A47J 31/36 (2006.01)

(52) U.S. Cl.
CPC .......... *A47J 31/3633* (2013.01); *A47J 31/3695* (2013.01); *A47J 31/3628* (2013.01)

(58) Field of Classification Search
CPC .............. A47J 31/3638; A47J 31/3633; A47J 31/3628; A47J 31/3695; A47J 31/369
USPC .............................. 99/302 P, 297, 295, 289 R
See application file for complete search history.

(56) References Cited

U.S. PATENT DOCUMENTS 5,479,848 A * 1/1996 Versini ............................ 99/287
6,510,783 B1 * 1/2003 Basile et al. ................. 99/289 R
(Continued)

FOREIGN PATENT DOCUMENTS

CN    101528094 A    9/2009
CN    101528099 A    9/2009
(Continued)

OTHER PUBLICATIONS

Chinese Office Action dated Sep. 2, 2013 received from related Application No. 201080045800.5, together with an English-language translation.
(Continued)

*Primary Examiner* — Reginald L Alexander
(74) *Attorney, Agent, or Firm* — Scully, Scott, Murphy & Presser PC (57) ABSTRACT

An infusion device for infusion capsules, particularly for espresso coffee machines, comprising a filter basket holder cylinder and a piston which can move with respect to each other from a configuration for loading and unloading at least one capsule for infusions into or from the filter basket holder cylinder to a dispensing configuration and vice versa, the device comprising first elements for movement of at least one of the filter basket holder cylinder and the piston for their first relative movement from the loading and unloading configuration to an intermediate configuration that is comprised between the loading and unloading configuration and the dispensing configuration and vice versa, and second elements for moving at least one of the filter basket holder cylinder and the piston for a second relative movement thereof from the intermediate configuration to the dispensing configuration and vice versa.

5 Claims, 8 Drawing Sheets

(56) References Cited

U.S. PATENT DOCUMENTS

| | | | |
|---|---|---|---|
| 6,763,759 B2* | 7/2004 | Denisart | 99/302 P |
| 7,487,713 B2* | 2/2009 | Magno | 99/302 P |
| 7,883,733 B2* | 2/2011 | Cortese | 426/590 |
| 7,946,217 B2* | 5/2011 | Favre et al. | 99/295 |
| 8,210,096 B2* | 7/2012 | Fin | 99/295 |
| 2005/0129809 A1 | 6/2005 | Cortese | |
| 2008/0041234 A1 | 2/2008 | Cortese | |
| 2009/0035438 A1 | 2/2009 | Cortese | |
| 2009/0199518 A1 | 8/2009 | Deuber et al. | |
| 2009/0249961 A1 | 10/2009 | Cheng | |
| 2009/0293736 A1* | 12/2009 | Jarisch | 99/295 |
| 2010/0037779 A1 | 2/2010 | Pecci et al. | |
| 2010/0107888 A1 | 5/2010 | Kollep et al. | |

FOREIGN PATENT DOCUMENTS

| | | |
|---|---|---|
| EP | 1 529 469 A1 | 5/2005 |
| WO | WO 2005/115206 A1 | 12/2005 |
| WO | WO 2006/005736 A2 | 1/2006 |
| WO | WO 2008/004116 A1 | 1/2008 |
| WO | WO 2008/096385 A1 | 8/2008 |

OTHER PUBLICATIONS

International Search Report dated Jan. 19, 2011 issued in PCT/EP2010/064282.

* cited by examiner

INFUSION DEVICE FOR INFUSION CAPSULES AND THE LIKE, PARTICULARLY FOR ESPRESSO COFFEE MACHINES AND THE LIKE

TECHNICAL FIELD

The present invention relates to an infusion device for infusion capsules and the like, particularly for espresso coffee machines and the like.

BACKGROUND ART

In the field of espresso coffee machines and the like, infusion devices are known which work with infusion capsules and the like and are constituted substantially by a main frame with which a filter basket holder cylinder and a piston are associated.

More precisely, the filter basket holder cylinder and the piston, which can move with respect to each other along a preferred direction, define a receptacle in which the capsule containing the substances through which hot or cold water is to be filtered, thus producing the desired infusion, is inserted.

Generally, the capsule consists of a hermetically closed container which is pierced, typically on two opposite faces, so as to allow the hot or cold water to filter through it, or it consists of a container with entry and exit holes provided on the two opposite faces, so as to allow the hot or cold water to filter through its interior.

In the case of capsules requiring piercing, the filter basket holder cylinder and the feeding piston in fact have hollow piercing tips, which protrude within the receptacle and in the direction of the capsule and are connected to the ducts for delivery of the hot or cold water and the discharge ducts of the infusion device for the outflow of the infusion.

In practice, once the capsule has been inserted in the corresponding receptacle, its piercing occurs by moving the filter basket holder and the piston closer together and mutual clamping of the filter basket holder cylinder and the piston, so that the piercing tips are pushed into the capsule. This piercing is made possible thanks to the presence of adapted lever systems, which are functionally connected to the filter basket holder cylinder or to the piston or to both and can be actuated manually by the operator by means of an actuation lever that can be gripped by the operator.

As an alternative, the actuation lever can be replaced by motor means, for example of the electrical type, so as to facilitate and automate the relative movement between the filter basket holder cylinder and the piston.

More precisely, the lever system, regardless of whether it is operated manually or automatically, moves the two elements, the filter basket holder cylinder and the piston, closer together with a single movement and in theory transmits the thrust required for piercing.

Likewise, these movements can also occur in infusion devices that do not provide for piercings of the capsule that contains the substances through which hot or cold water is to filter, thus producing the desired infusion, since they are already provided with the water passage holes.

These known types of infusion devices are not devoid of drawbacks, which include the fact that the thrust provided by the operator can entail an effort which is inconvenient to said operator both when using capsules to be pierced and when using capsules not to be pierced.

Moreover, if capsules to be pierced are used, the material of which such capsules are made has a resistance to piercing that requires a mutual thrust between the filter basket holder cylinder and the piston that is much greater than the thrust required to achieve the simple mutual approach of the filter basket holder cylinder and the feeding piston.

DISCLOSURE OF THE INVENTION

The aim of the present invention is to provide an infusion device for infusion capsules and the like, particularly for espresso coffee machines and the like, that makes it possible to provide the mutual approach of the filter basket holder cylinder and of the piston and the piercing of the infusion capsule if necessary, without requiring excessive physical efforts on the part of the operator.

Within this aim, an object of the present invention is to provide an infusion device for infusion capsules and the like, particularly for espresso coffee machines and the like, that allows a smooth and controlled mutual approach between the cylinder and piston.

Another object of the present invention is to provide an infusion device that is highly reliable, relatively simple to provide and has competitive costs.

This aim, as well as these and other objects that will become better apparent hereinafter, are achieved by an infusion device for infusion capsules and the like, particularly for espresso coffee machines and the like, comprising a filter basket holder cylinder and a piston which can move with respect to each other from a configuration for loading and unloading at least one capsule for infusions and the like into or from said filter basket holder cylinder to a dispensing configuration and vice versa, characterized in that it comprises first means for movement of at least one of said filter basket holder cylinder and said piston for their first relative movement from said loading and unloading configuration to an intermediate configuration that is comprised between said loading and unloading configuration and said dispensing configuration and vice versa, and second means for moving at least one of said filter basket holder cylinder and said piston for a second relative movement thereof from said intermediate configuration to said dispensing configuration and vice versa.

BRIEF DESCRIPTION OF THE DRAWINGS

Further characteristics and advantages of the present invention will become apparent from the description of a preferred but not exclusive embodiment of an infusion device for infusion capsules and the like, particularly for espresso coffee machines and the like, according to the invention, illustrated by way of non-limiting example in the accompanying drawings, wherein.

WAYS OF CARRYING OUT THE INVENTION

With reference to the figures, the infusion device for infusion capsules and the like, particularly for espresso coffee machines and the like, generally designated by the reference numeral 1, comprises a fixed frame 2, which can be fixed to the espresso machine or the like on which the infusion device 1 is installed, a filter basket holder cylinder 3 and a piston 4 which can move with respect to each other from a configuration for loading and unloading at least one capsule 5 for infusions and the like to a dispensing configuration and vice versa.

As will be described in greater detail hereinafter, the expression "loading and unloading configuration" is understood to refer to a configuration of the infusion device 1 in which the filter basket holder cylinder 3 and the piston 4 are arranged, with respect to each other, so as to allow the manual or automatic insertion or extraction of the capsule 5 from the infusion device 1, and the expression "dispensing configuration" is understood to refer to a configuration of the infusion device 1 in which the filter basket holder cylinder 3, the piston 4 and the capsule 5 are arranged with respect to each other in the positions provided for filtering hot or cold water through the capsule 5 and for obtaining the desired infusion.

More precisely, the filter basket holder cylinder 3 is jointly associated with the fixed frame 2, being coupled thereto, and the piston 4 can move with respect to the filter basket holder cylinder 3 along a predefined sliding direction 6.

The piston 4 consists substantially of a disk-like body, which is inserted slidingly within a piston supporting element 7, which in turn is slidingly associated with the fixed frame 2 along a sliding direction 6. Advantageously, the piston 4 is kept in an abutment position against an abutment surface 8 of the piston supporting element 7 by elastic means 22, which comprise for example two helical springs which are conveniently interposed between the piston 4 and the piston supporting element 7.

Differently, the filter basket holder cylinder 3 consists of a container body, which is for example substantially cylindrical and defines at least one receptacle 10 that is adapted to contain the capsule 5 and is open at the face 11 of the filter basket holder cylinder 3 that is directed toward the piston 4 for the insertion and extraction of the capsule 5 into or from the receptacle 10 when the filter basket holder cylinder 3 and the piston 4 are arranged in the configuration for loading and unloading the infusion device 1.

As shown in the figures, the receptacle 10 is such that the open face 11 is substantially perpendicular to the predefined sliding direction 6.

In this manner, the piston 4, by moving toward the filter basket holder cylinder 3 at the face 11 and at right angles thereto, closes the receptacle 10 that contains the capsule 5.

This arrangement of the filter basket holder cylinder 3, of the piston 4 and of the capsule 5 defines the dispensing configuration of the infusion device 1.

For allowing extraction of the capsule 5 from the receptacle 10, on the bottom of said receptacle there is, for example, an expulsion spring 9, and the capsule 5 has a radially protruding rim 5a that rests against the face 11 of the filter basket holder cylinder.

In order to allow piercing of the capsule 5, first hollow piercing tips 12 for the capsule 5 are provided which are associated with the piston 4 on the side that is directed toward the receptacle 10.

More precisely, these first hollow piercing tips 12 extend outside the piston 4 on the side directed toward the receptacle 10, i.e., inside the receptacle 10, with the piston 4 arranged in the dispensing configuration, in the direction of the capsule 5, and are connected to ducts 13 for delivering hot or cold water so as to inject such hot or cold water into the capsule 5 to consequently produce the infusion.

Likewise, second hollow tips 14 for piercing the capsule 5 are provided which are associated with the filter basket holder cylinder 3 on the side opposite to the open face 11 of the receptacle 10. More precisely, the second hollow piercing tips 14 extend within the receptacle 10 in the direction of the capsule 5 and are connected to ducts 15 for discharging the infusion for its outflow from the capsule 5.

According to the invention, first means 16 for moving at least one of the filter basket holder cylinder 3 and the piston 4 are provided for a first relative movement thereof from the loading and unloading configuration to an intermediate configuration that is comprised between the loading and unloading configuration and the dispensing configuration and vice versa.

More particularly, the first movement means 16 are manually actuated and comprise an actuation lever 17, which is associated rotatably with the fixed frame 2 and can be gripped by the operator. The actuation lever 17 is functionally connected to the piston supporting element 7 by means of a lever system 18, which is constituted by a plurality of levers pivoted to each other and adapted to convert the rotary motion of the actuation lever 17 into a translational motion of the piston supporting element 7.

In this manner, the first relative movement between the loading and unloading configuration and the intermediate configuration and vice versa is provided.

Figure 1:
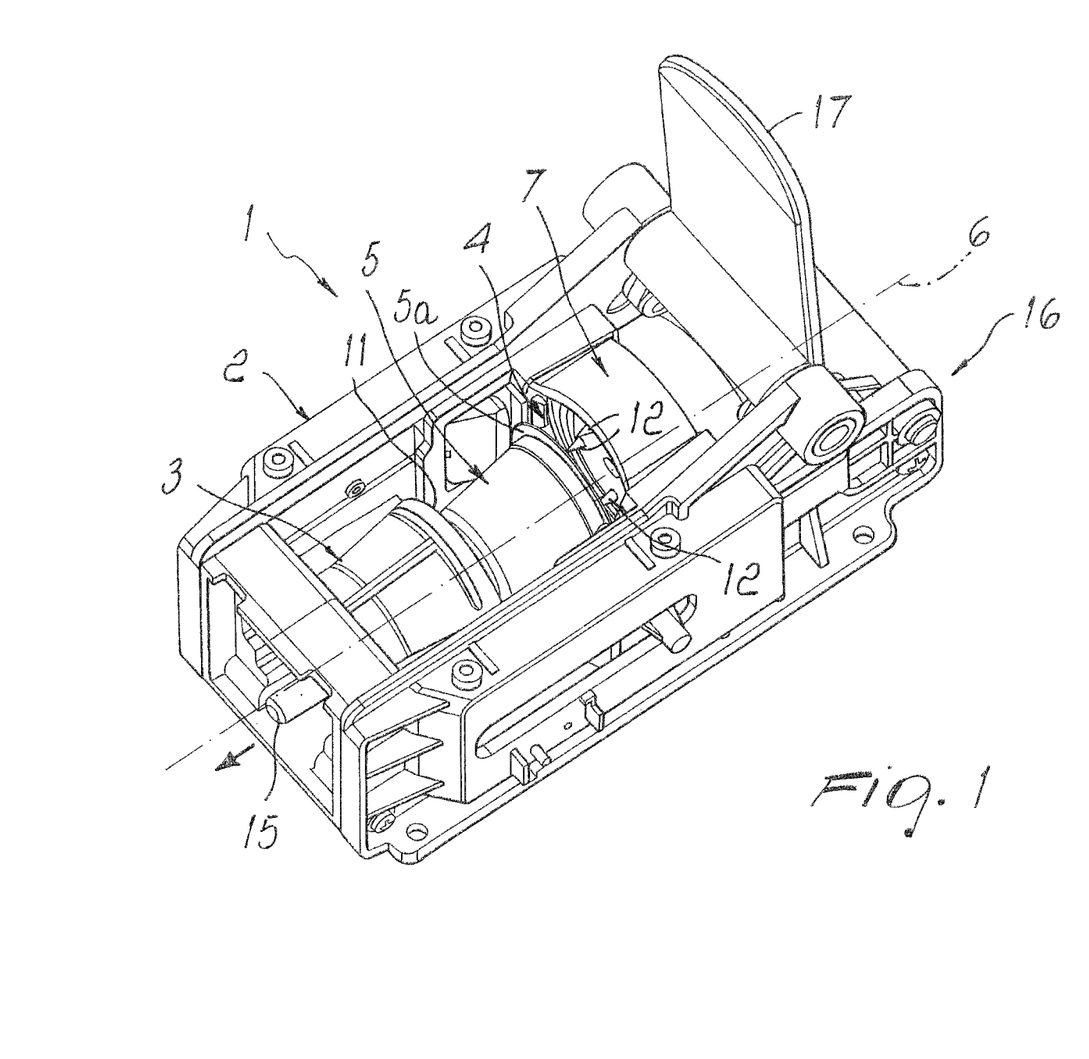
FIG. 1 is a perspective view of the infusion device for infusion capsules and the like, particularly for espresso coffee machines and the like, according to the invention, in the loading and unloading configuration.
Figure 2:
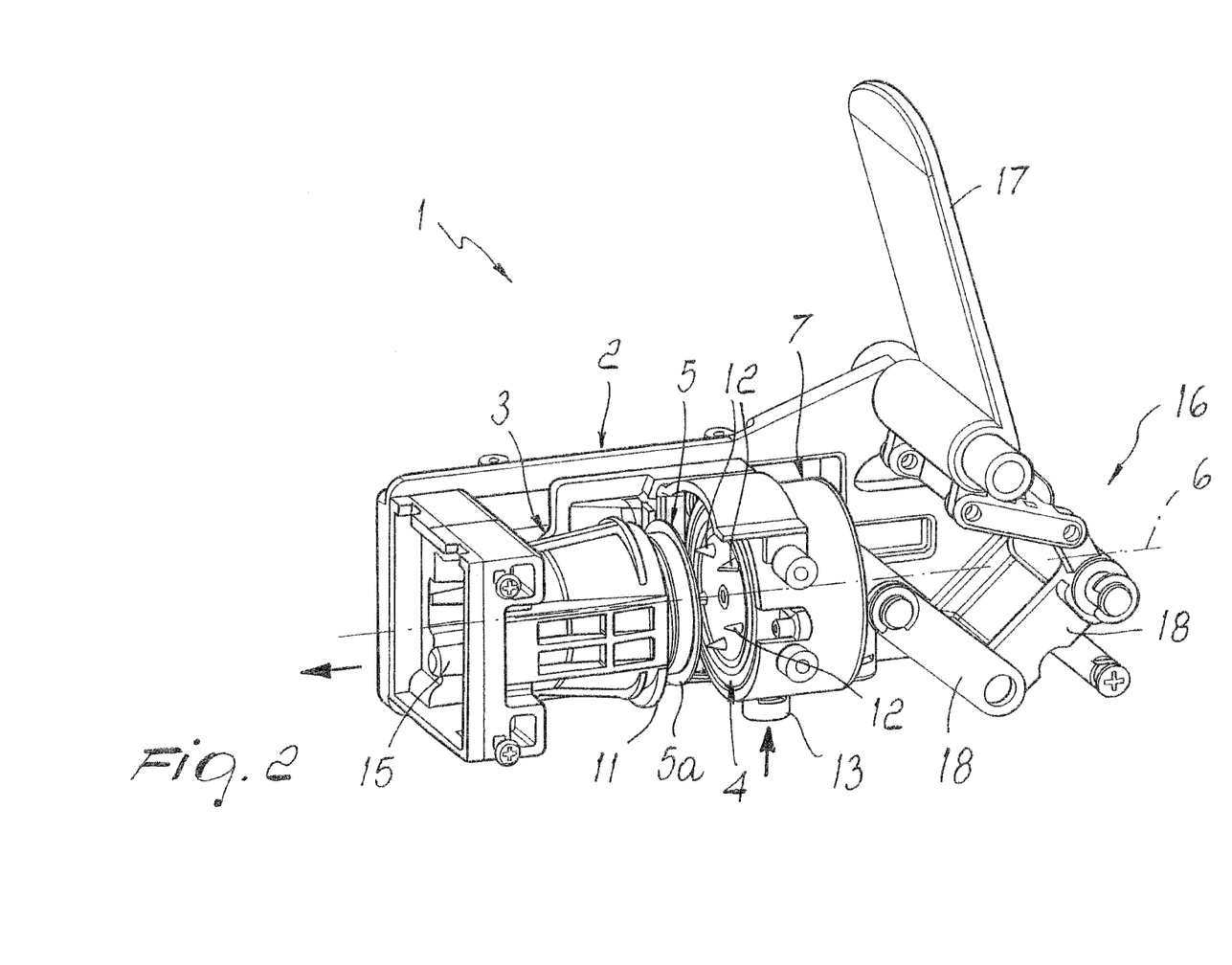
FIG. 2 is a partially cutout perspective view of the infusion device shown in FIG. 1 in the loading and unloading configuration.
Figure 3:
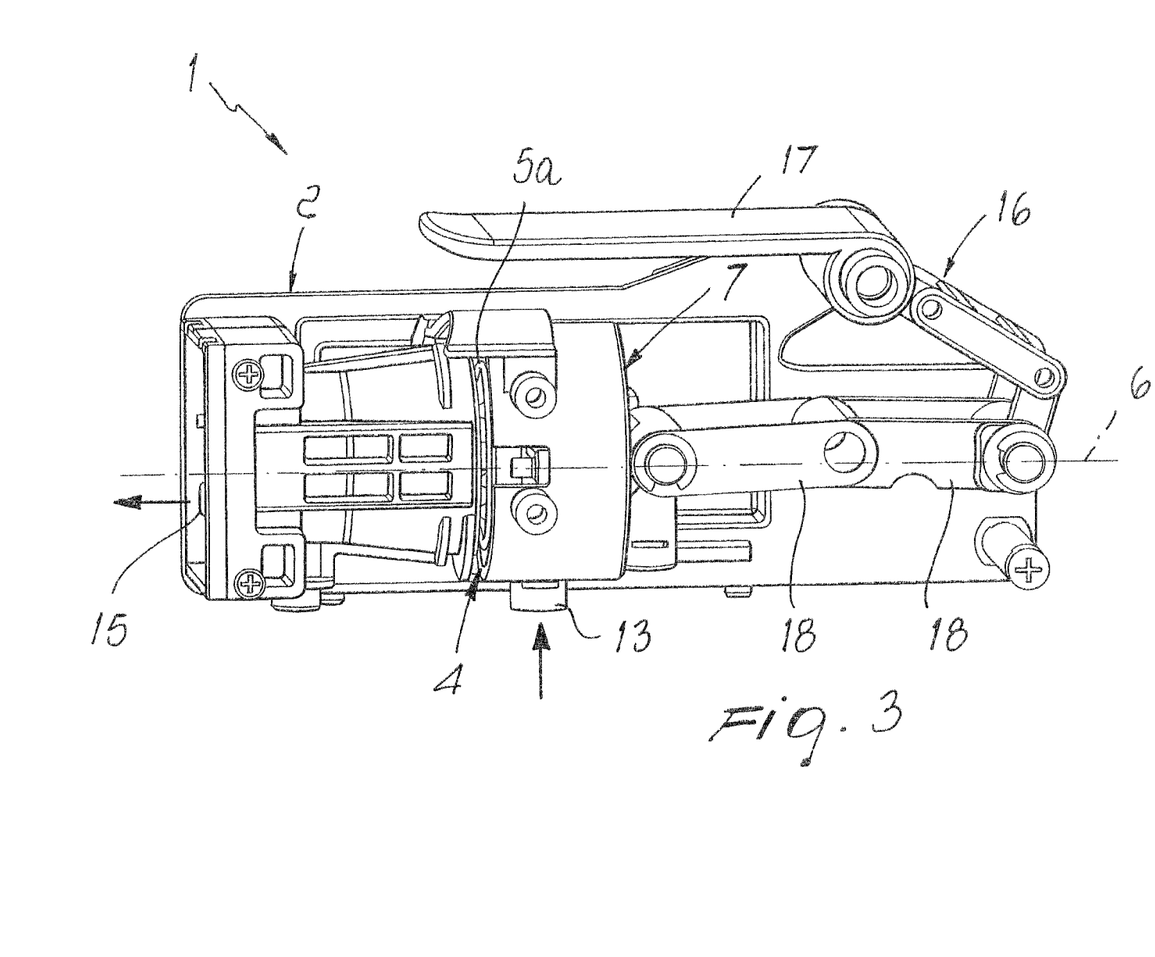
FIG. 3 is a partially cutout perspective view of the infusion device shown in FIG. 1 in the intermediate configuration.
Figure 4:
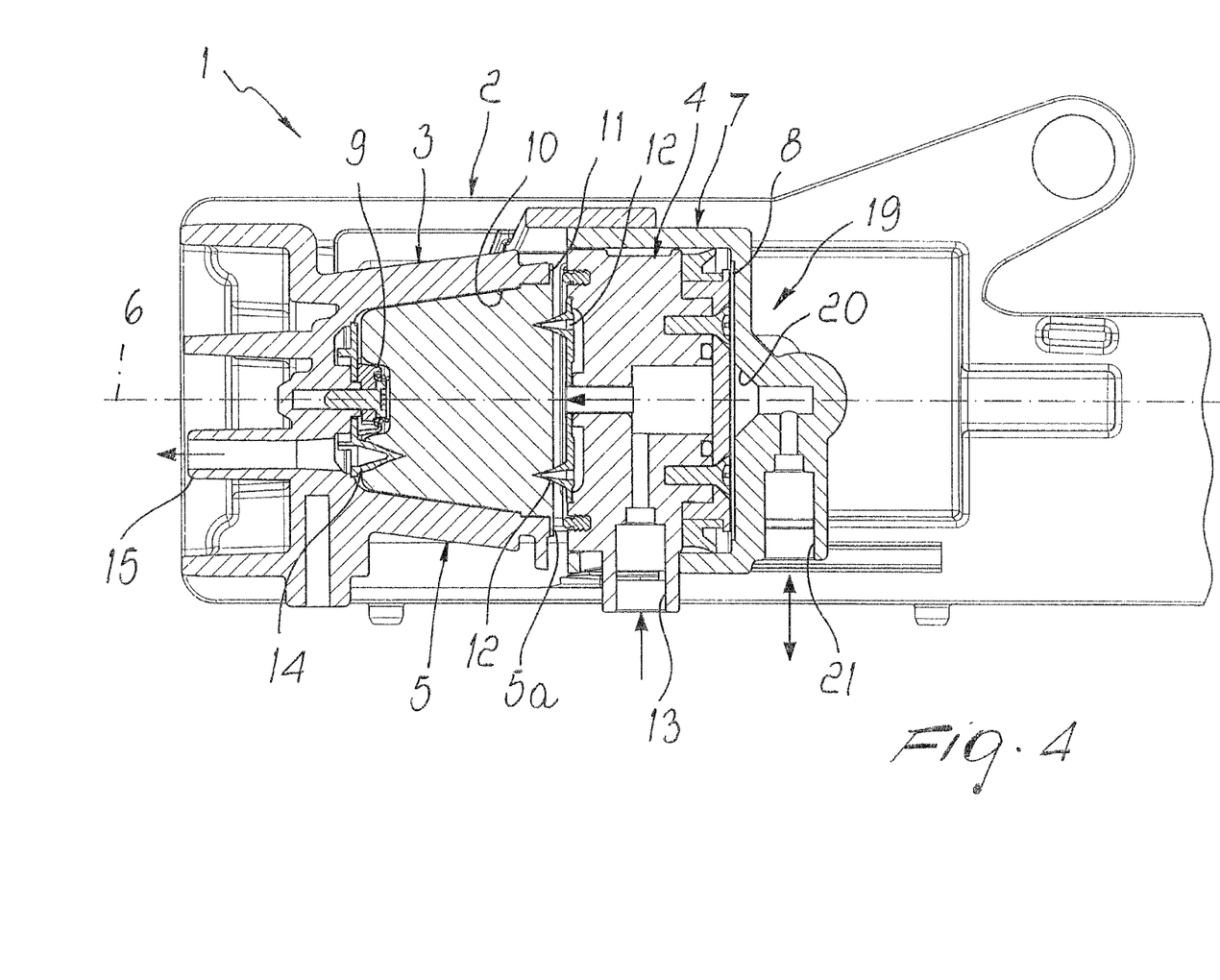
FIG. 4 is a longitudinal sectional view of the infusion device shown in FIG. 3.
Figure 5:
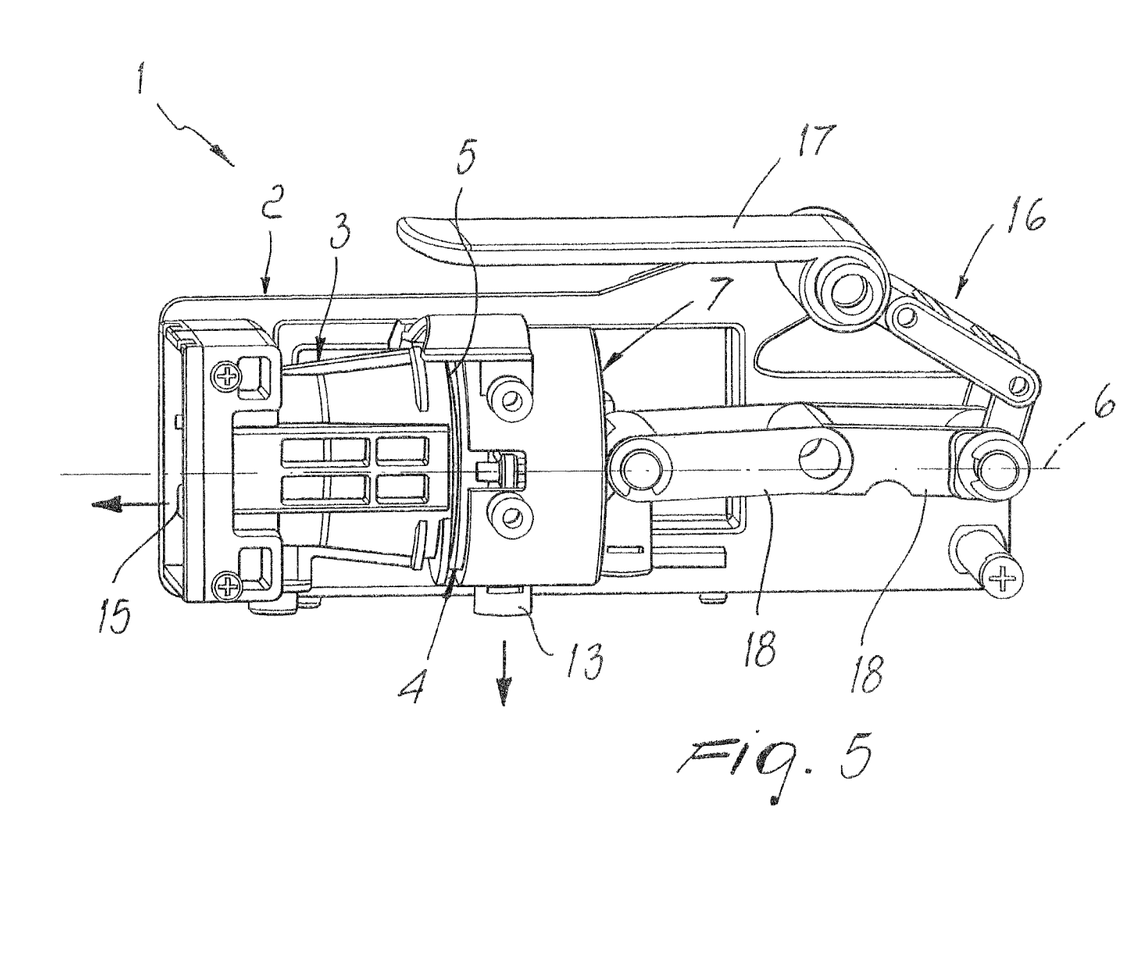
FIG. 5 is a partially cutout perspective view of the infusion device shown in FIG. 1 in the dispensing configuration.
Figure 6:
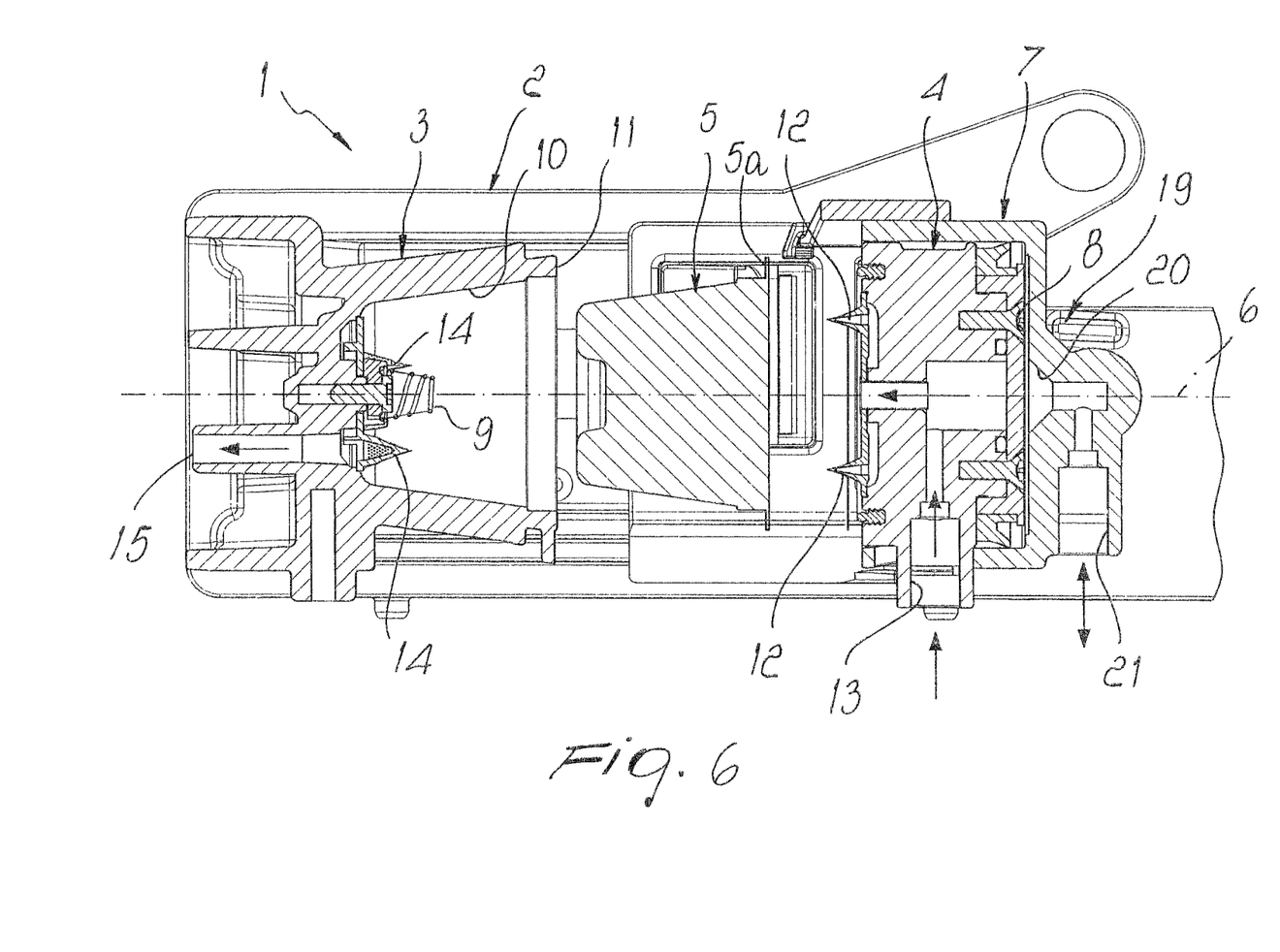
FIG. 6 is a longitudinal sectional view of the infusion device shown in FIG. 1 in the loading and unloading configuration, in particular with the capsule shown in the loading position.
Figure 7:
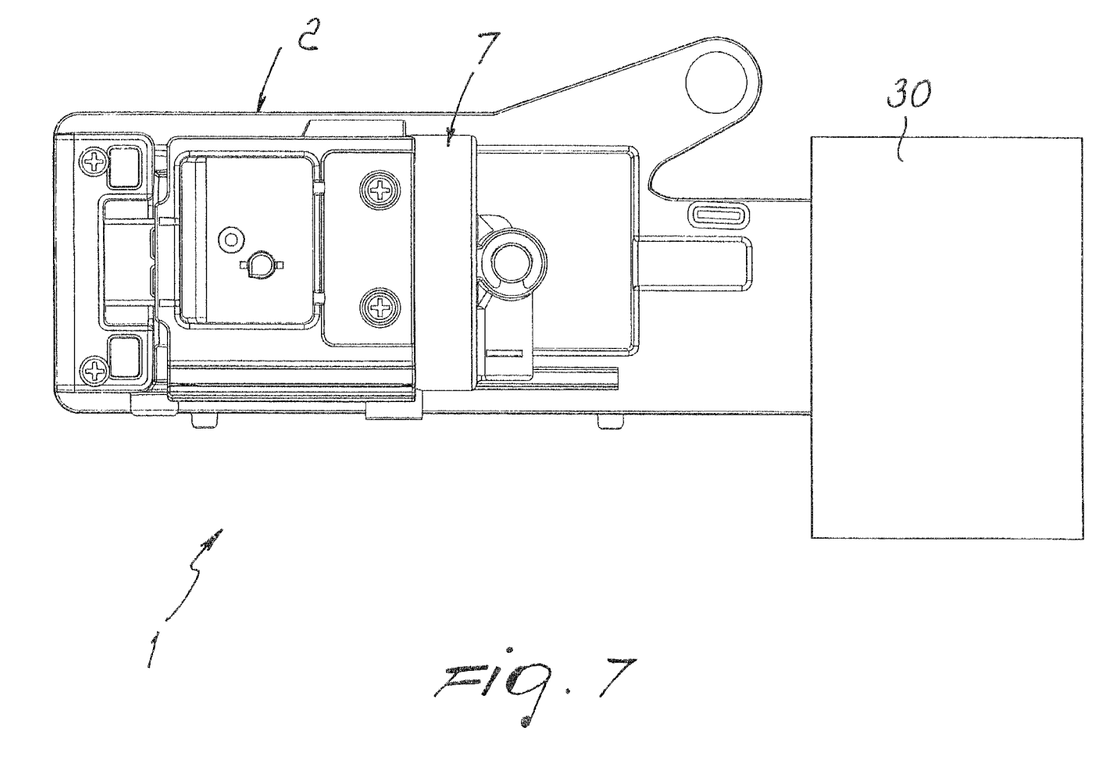
FIG. 7 is a longitudinal sectional view of a second embodiment of the infusion device according to the present invention.
Figure 8:
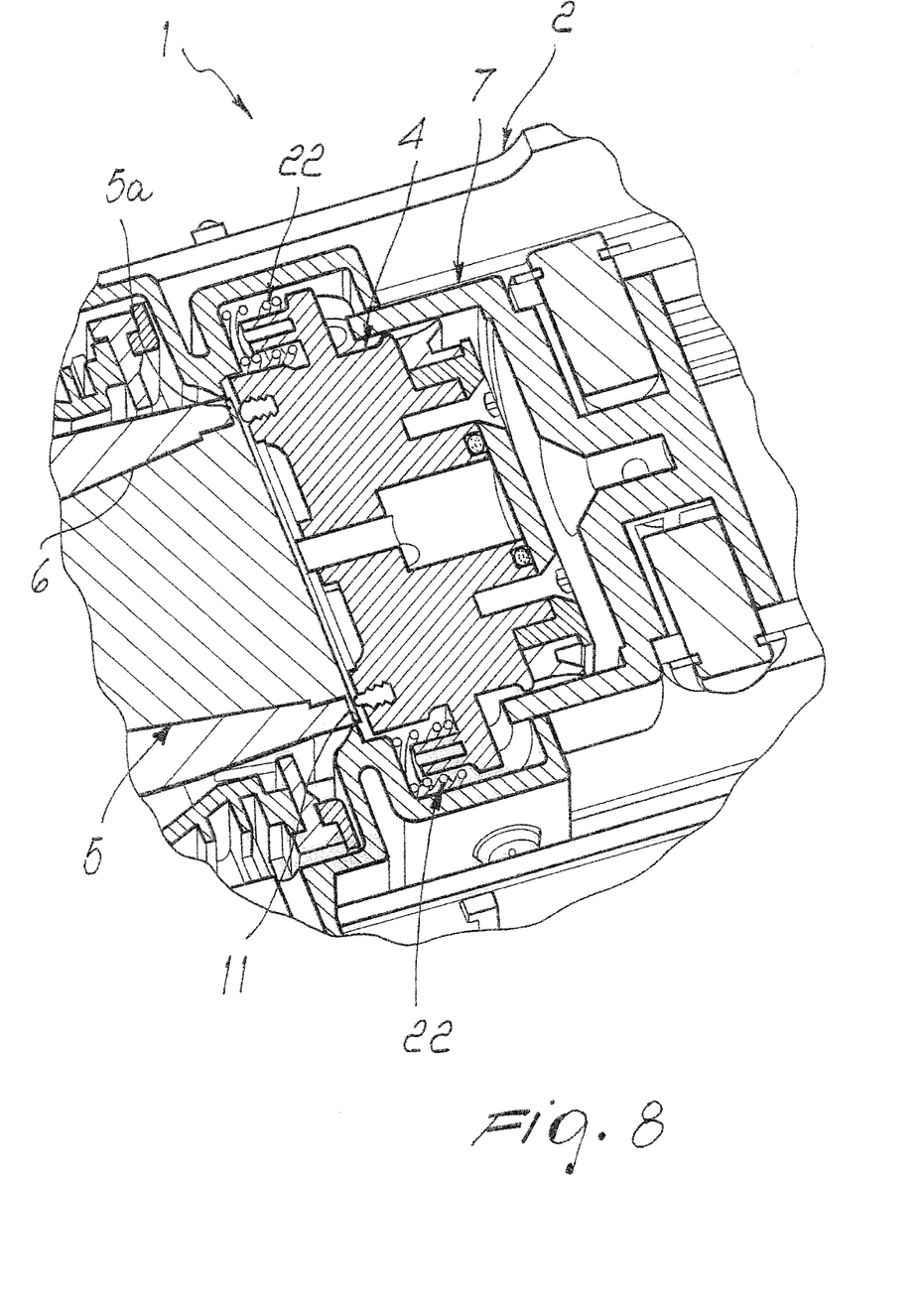
FIG. 8 is a longitudinal sectional view of the infusion device shown in FIG. 3.

As an alternative, in an automated variation of the infusion device 1, shown in FIG. 7, the first movement means 16 are actuated automatically and comprise motor means 30, for example of the electrical type, which are associated with the fixed frame 2 and are functionally connected to the piston supporting element 7 so as to replace the actuation lever 17 and the lever system 18 to provide the first relative movement between the loading and unloading configuration and the intermediate configuration and vice versa.

According to the invention, second movement means 19 for at least one of the filter basket holder cylinder 3 and the piston 4 are also comprised for a second relative movement thereof from the intermediate configuration described earlier to the dispensing configuration and vice versa.

Advantageously, the second movement means 19 comprise an expansion chamber 20, which is interposed between the piston 4 and the abutment surface 8.

More precisely, the expansion chamber 20 can be filled with a propellant fluid, for example cold water or gas, which is injected under pressure through at least one passage channel 21 for the relative movement of the piston 4 with respect to the piston supporting element 7 in contrast with the action of the elastic means 22, which are constituted for example by helical springs, and the completion of the relative movement between the filter basket holder cylinder 3 and the piston 4, with consequent completion of the piercing of the capsule 5 by the first and second hollow piercing tips 12 and 14 and arrangement of said components in the dispensing configuration.

In a possible variation of the invention, the movement between the filter basket holder cylinder 3 and the piston 4 can be reversed. In this case, the piston 4 is associated jointly with the fixed frame 2 and the filter basket holder cylinder 3 is movable with respect to the piston 4 along the sliding direction 6 by way of the first and second movement means 16 and 19.

Operation of the infusion device 1 for infusion capsules and the like, particularly for espresso coffee machines and the like, is clear and evident from what has been described.

In particular it is noted that once the capsule 5 been loaded into the adapted receptacle 10, by acting on the first movement means 16, i.e., by acting manually on the actuation lever 17 or by activating the motor means 30 if provided, it is possible to make the piston supporting element 7, and consequently the piston 4, move toward the filter basket holder cylinder 3.

This approach moves the hollow piercing tips 12 and 14 into contact with the walls of the capsule 5 without penetrating the capsule completely.

Then, by way of the second movement means 19, it is possible to complete the approach of the piston 4 to the filter basket holder cylinder 3, performing the complete piercing of the capsule 5 by the hollow piercing tips 12 and 14 and sealing the receptacle 10 with the piston 4 proper, in order to allow the injection of the hot or cold water and obtain the infusion.

This approach is made possible thanks to the filling of the expansion chamber 20 with the filling fluid that generates the propulsion required to overcome the resistance of the elastic means 22 and the piercing resistance of the material of which the capsule 5 is made, so as to make the hollow piercing tips 12 and 14 penetrate completely into the capsule 5.

Likewise, if one uses a capsule 5 of the pre-perforated type, its holes can be connected functionally to the water delivery ducts 13 for the injection of the water into the at least one capsule 5, producing the infusion, and to the discharge ducts 15 of the infusion for the outflow of the infusion from the at least one capsule 5.

In practice it has been found that the infusion device for infusion capsules and the like, particularly for espresso coffee machines and the like, according to the present invention, fully achieves the intended aim and objects, since it allows transition from the loading and unloading configuration to the dispensing configuration in an automated manner, at least for the second part of the movement, without forcing the operator to perform particularly tiring operations both when using capsules of the pre-perforated type and when using capsules to be pierced.

Another advantage of the infusion device according to the present invention consists in that it has a smaller space occupation than known types of infusion devices.

Since the operator does not have to apply a particularly intense thrust in order to make the filter basket holder cylinder and the piston move closer together and make the piercing tips penetrate into the capsule, if a capsule that is not of the pre-perforated type is used, and since the lever systems adapted to convert the rotary motion of the actuation lever or of the motor means into the translational motion of the feeding piston do not have to transmit and amplify said high thrust, such means can use shorter levers, reducing the general space occupation of the infusion device.

A further advantage of the infusion device according to the present invention consists in that it is structurally simple and therefore economically competitive if compared with infusion devices of the known type.

The infusion device for infusion capsules and the like, particularly for espresso coffee machines and the like, according to the present invention is susceptible of numerous modifications and variations, all of which are within the scope of the appended claims.

All the details may further be replaced with other technically equivalent elements.

In practice, the materials used, as long as they are compatible with the specific use, as well as the contingent shapes and dimensions, may be any according to requirements and to the state of the art.

The disclosures in Italian Patent Application No. MI2009A001770 from which this application claims priority are incorporated herein by reference.

The invention claimed is:

1. An infusion device for infusion capsules and the like, particularly for espresso coffee machines and the like, comprising a filter basket holder cylinder and a piston which can move with respect to each other from a configuration for loading and unloading at least one capsule for infusions and the like into or from said filter basket holder cylinder to a dispensing configuration and vice versa, first means for movement of said piston for a first movement from said loading and unloading configuration to an intermediate configuration that is comprised between said loading and unloading configuration and said dispensing configuration and vice versa, and second means for moving said piston for a second movement thereof from said intermediate configuration to said dispensing configuration and vice versa, said piston being inserted slidingly in a piston supporting element, which is associated with a fixed frame and being kept in abutment position against an abutment surface of said piston supporting element by elastic means, wherein said second movement means comprise an expansion chamber, which is interposed between said piston and said abutment surface, said expansion chamber being able to be filled with a pusher fluid which is injected under pressure through at least one passage channel for the relative movement of said piston with respect to said piston supporting element in opposition to the action of said elastic means, wherein at least one receptacle of said at least one capsule, which is formed substantially by said filter basket holder cylinder and is open at a face of said filter basket holder cylinder that is directed toward said piston for the insertion and extraction of said at least one capsule in and from said at least one receptacle in said loading and unloading configuration, and wherein said filter basket holder cylinder is jointly and fixedly associated with a fixed frame and said piston can move with respect to said filter basket holder cylinder along a sliding direction which is substantially perpendicular to said open face of said at least one receptacle, and wherein said first movement means are actuated manually and comprise an actuation lever, which is associated rotatably with said fixed frame and can be gripped by the operator, said actuation lever being connected functionally to said piston supporting element by means of a lever system for providing said first movement and vice versa.

2. The infusion device according to claim 1, further comprising first hollow tips for piercing said at least one capsule, which are associated with said piston and connected to water delivery ducts for injecting said water into said at least one capsule, producing the infusion, said first hollow piercing tips protruding outside said piston on the side that is directed toward said at least one receptacle.

3. The infusion device according to claim 2, further comprising second hollow tips for piercing said at least one capsule, which are associated with said filter basket holder cylinder and are connected to discharge ducts of said infusion for the outflow of said infusion from said at least one capsule, said second hollow piercing tips protruding inside said at least one receptacle in the direction of said at least one capsule.

4. The infusion device according to claim 1, wherein said at least one capsule has holes which can be connected functionally to water delivery ducts for injection of said water into said at least one capsule, producing the infusion, and to discharge ducts of said infusion for the outflow of said infusion from said at least one capsule.

5. The infusion device according to claim 1, wherein said first movement means are actuated automatically and comprise motor means which are associated with said fixed frame and functionally connected to said piston supporting element in order to provide said first movement and vice versa.

* * * * *